US009125220B2

(12) United States Patent
Hosono et al.

(10) Patent No.: US 9,125,220 B2
(45) Date of Patent: Sep. 1, 2015

(54) MOBILE COMMUNICATION SYSTEM, BASE STATION, AND MOBILE COMMUNICATION METHOD

(75) Inventors: Hiroyuki Hosono, Tokyo (JP); Takeshi Terayama, Tokyo (JP); Takeshi Okamoto, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 222 days.

(21) Appl. No.: 13/702,773

(22) PCT Filed: Jun. 7, 2011

(86) PCT No.: PCT/JP2011/063075
§ 371 (c)(1),
(2), (4) Date: Feb. 25, 2013

(87) PCT Pub. No.: WO2011/155498
PCT Pub. Date: Dec. 15, 2011

(65) Prior Publication Data
US 2013/0150069 A1    Jun. 13, 2013

(30) Foreign Application Priority Data

Jun. 7, 2010  (JP) ................ P2010-130535

(51) Int. Cl.
*H04W 72/08*  (2009.01)
*H04W 24/02*  (2009.01)
(Continued)

(52) U.S. Cl.
CPC ............ *H04W 72/085* (2013.01); *H04W 24/02* (2013.01); *H04W 36/0083* (2013.01); *H04W 48/18* (2013.01)

(58) Field of Classification Search
CPC ..... H04W 16/16; H04W 16/32; H04W 24/02; H04W 24/10; H04W 52/30; H04W 52/32; H04W 52/34; H04W 52/38; H04W 52/40; H04W 52/143; H04W 52/244; H04W 52/245; H04W 56/00
USPC ................... 455/434–444; 370/328–338, 350
See application file for complete search history.

(56) References Cited

U.S. PATENT DOCUMENTS

2003/0045320 A1   3/2003  Tanno et al.
2010/0067482 A1*  3/2010  Vikberg et al. ............... 370/331
(Continued)

FOREIGN PATENT DOCUMENTS

CN        1404321 A    3/2003
CN      101529941 A    9/2009
(Continued)

OTHER PUBLICATIONS

3GPP TSG-RAN Working Group 4 (Radio) meeting #44bis, "LTE Home Node B downlink simulation results with flexible Home Node B power," Nokia Siemens Networks, R4-071540, Oct. 8-12, 2007.*
(Continued)

*Primary Examiner* — San Htun
*Assistant Examiner* — Erica Navar
(74) *Attorney, Agent, or Firm* — Oblon, McClelland, Maier & Neustadt, L.L.P.

(57) ABSTRACT

A radio network controller includes an acquisition unit configured to acquire a radio communication state of a neighboring cell located around a cell formed by a base station which the mobile station camps on among base stations, and a level determination unit configured to determine the in-out reception level based on an acquisition result of the radio communication state by the acquisition unit. The level determination unit calculates an estimated reception level of the radio channel in a reception level tie point P in which the reception level of the radio channel transmitted by a base station 200 and the reception of the radio channel transmitted by a target base station 202 become substantially equal to each other, and determines the in-out reception level based on the calculated estimated reception level α.

6 Claims, 6 Drawing Sheets

(51) Int. Cl.
 *H04W 36/00* (2009.01)
 *H04W 48/18* (2009.01)

(56) References Cited

U.S. PATENT DOCUMENTS

| 2011/0182224 A1 | 7/2011 | Ishii |
| 2011/0217974 A1* | 9/2011 | Naka et al. ............ 455/423 |

FOREIGN PATENT DOCUMENTS

| JP | 2003 69480 | 3/2003 |
| JP | 2010 507963 | 3/2010 |
| WO | 2010 018818 | 2/2010 |
| WO | 2010 061628 | 3/2010 |

OTHER PUBLICATIONS

Office Action issued Nov. 19, 2013 in Japanese Patent Application No. 2012-519400 (with English language translation).
3GGP TS 22.220 V10.2.0, "3$^{rd}$ Generation Partnership Project; Technical Specification Group Services and System Aspects; Service requirements for Home Node B (HNB) and Home eNode B (HeNB) (Release 10)," Total 24 pages, (Mar. 2010.
International Search Report Issued Aug. 2, 2011 in PCT/JP11/63075 Filed Jun. 7, 2011.
Office Action issued Dec. 5, 2014 in Chinese Patent Application No. 201180028129.8 (with English language translation).

\* cited by examiner

| NEIGHBORING BASE STATION | SECTOR | RECEPTION LEVEL OF SHARED CONTROL CHANNEL | TRANSMISSION LEVEL OF SHARED CONTROL CHANNEL |
|---|---|---|---|
| 201 | 1 | −110dBm | 10dBm |
| 202 | 1 | −90dBm | 40dBm |
|  | 2 | −113dBm |  |
|  | 3 | −115dBm |  |
| 203 | 1 | −102dBm | 40dBm |
|  | 2 | −110dBm |  |

MOBILE COMMUNICATION SYSTEM, BASE STATION, AND MOBILE COMMUNICATION METHOD

TECHNICAL FIELD

The present invention relates to a mobile communication system, a base station, and a mobile communication method for controlling an in-out reception level for determining whether or not a mobile station is to camp on a cell formed by the base station.

BACKGROUND ART

Mobile communication systems have been required to ensure service qualities in accordance with the contents of communication requests randomly made by mobile stations (users). Thus, when installing a base station, a mobile telecommunications carrier generally estimates the size of a service area and traffic generated in the service area, and uses means such as simulation to design the installation location and configuration of the base station as well as radio parameters such as a transmission level of a downlink common control channel transmitted from the base station.

In addition, in designing such a base station, an in-out reception level is determined which is a reception level indicating whether or not a mobile station is to camp on a cell formed by the base station. For example, in the case of the W-CDMA system, a mobile station camps on the cell when a measured RSCP exceeds Qrxlevmin based on the Qrxlevmin broadcasted from the cell whose measured RSCP is the highest. On the other hand, when the regularly-measured Received Signal Code Power (RSCP) becomes equal to or lower than the Qrxlevmin after completion of the procedure to camp on the cell, the mobile station tries to camp on another cell.

Furthermore, recently, small-sized base stations (Home NodeB) installed by users of mobile stations at home or the like have been increased in addition to base stations for public communications installed by the above-described mobile telecommunications carrier. In the case of a small-sized base station, the users are limited and the size of the cell is small compared with the base station for public communications. Thus, an increase in throughput can be expected (see, NON-PATENT DOCUMENT 1)

PRIOR ART DOCUMENT

Non-Patent Document

NON-PATENT DOCUMENT 1: 3GPP TS 22.220, Service requirements for Home NodeBs (UMTS) and Home eNodeBs (LTE)

SUMMARY OF THE INVENTION

A small base station such as a Home NodeB can be freely installed by a user of a mobile station or the like. Accordingly, the design for a base station by means of such a simulation cannot be employed, and Self Configuration in which a small-sized base station or the like autonomously sets radio parameters is needed.

However, in an apartment and the like, the small base stations are likely to be installed in a crowded manner. Thus, a mobile station of a user cannot always camp on a cell formed by a small base station installed by the user, but may possibly camp on another cell instead. When this happens, the mobile station cannot enjoy advantage of an increase in throughput provided by the small base station.

Thus, an objective of the invention is to provide a mobile communication system, a base station, and a mobile communication method with which a mobile station can securely enjoy advantage of the increase in throughput by a small-sized base station.

A characteristic of the invention relates to a mobile communication system configured to control an in-out reception level for determining whether or not a mobile station (a mobile station 300) is to camp on a cell formed by a base station (e.g., a base station 200), the mobile communication system comprising: an acquisition unit (radio information acquisition unit 110) configured to acquire a radio communication state of a neighboring cell (e.g., cell 251) located around a cell formed by the base station which the mobile station camps on among base stations, and a level determination unit (in-out reception level determination unit 130) configured to determine the in-out reception level based on the acquisition result of the radio communication state by the acquisition unit. The acquisition unit acquires a reception level of the base station receiving a radio channel transmitted by the neighboring cell, and a transmission level of the radio channel transmitted by the neighboring cell. Based on the highest reception level among the reception levels of the base station receiving radio channels transmitted by neighboring cells, and the transmission level of the radio channel in a target base station transmitting the radio channel having the highest reception level, the level determination unit calculates an estimated distance between the base station and the target base station. Based on the calculated estimated distance, the level determination unit calculates an estimated reception level of the radio channel in a reception level tie point in which the reception level of the radio channel transmitted by the base station and the reception level of the radio channel transmitted by the target base station become substantially equal to each other, and determines the in-out reception level based on the calculated estimated reception level.

In the above-described characteristic of the invention, the level determination unit may calculate a first estimated reception level based on a propagation loss equation and the transmission level of the radio channel transmitted by the base station, may calculate a second estimated reception level based on the propagation loss equation and the transmission level of the radio channel transmitted by the target base station, may calculate the reception level tie point so that the first estimated reception level and the second estimated reception level become equal to each other, and may determine the calculated first estimated reception level as the in-out reception level.

In the above-described characteristic of the invention, the level determination unit may calculate the in-out reception level by adding a first offset value to the calculated first estimated reception level.

In the above-described characteristic of the invention, the level determination unit may calculate the estimated reception level in the reception level tie point based on a corrected reception level obtained by adding a second offset value to the reception level of the radio channel transmitted by the base station.

MODES FOR CARRYING OUT THE INVENTION

Figure 1:
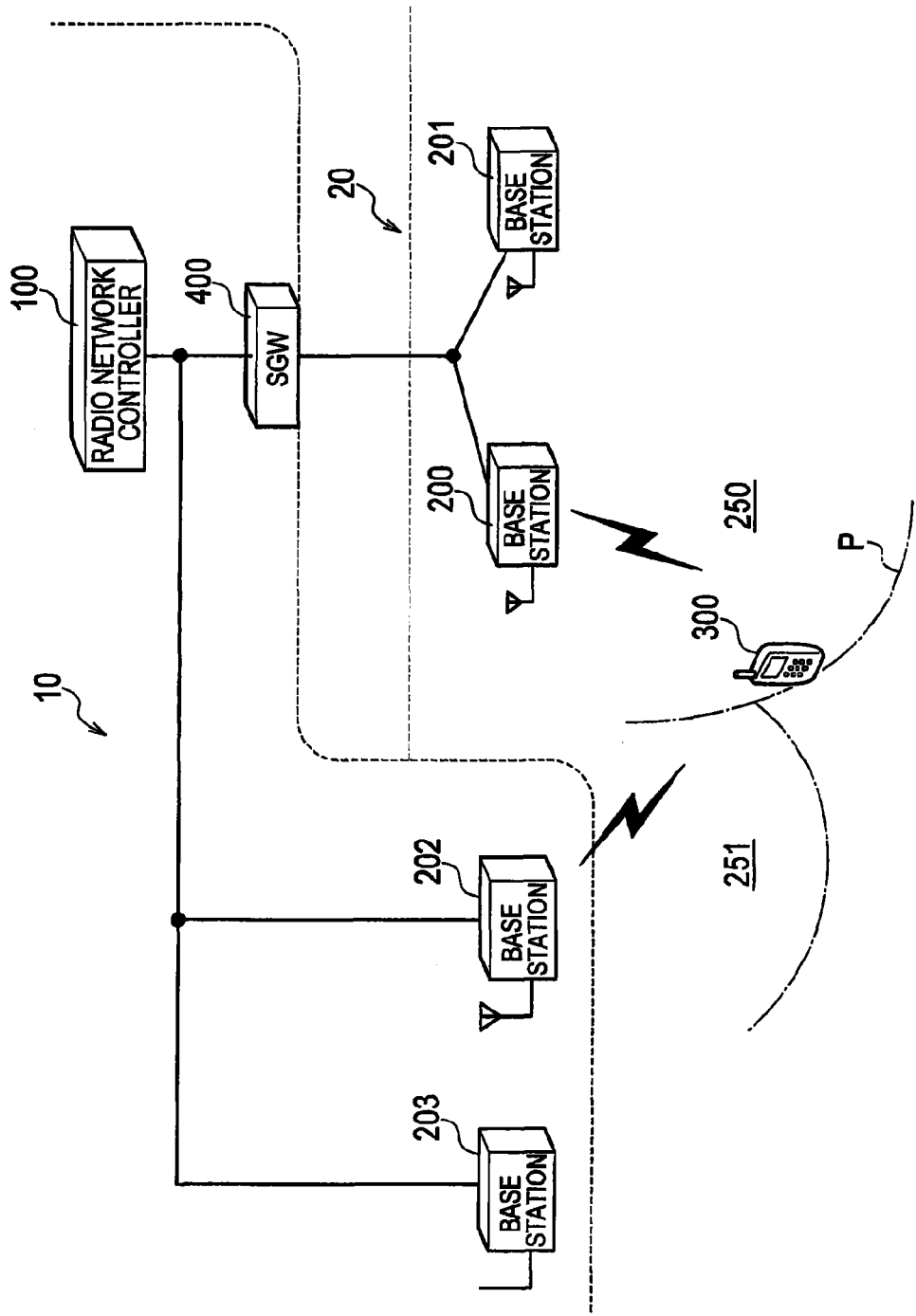
FIG. 1 is an overall schematic configuration diagram of a mobile communication system according to an embodiment of the present invention.

Hereinafter, an embodiment of the present invention is described. In the following description of the drawings, same or similar reference numerals are given to denote same or similar portions. Note that the drawings are merely schematically shown and proportions of sizes and the like are different from actual ones.

Thus, specific sizes and the like should be judged by referring to the description below. In addition, there are of course included portions where relationships or percentages of sizes of the drawings are different with respect to one another.

(1) Overall Schematic Configuration of Mobile Communication System

FIG. 1 is an overall schematic configuration diagram of a mobile communication system according to the present embodiment. Specifically, FIG. 1 shows an example of a configuration of a radio access network representative in the mobile communication system.

The mobile communication system shown in FIG. 1 complies with the W-CDMA scheme, and base stations 200 to 203 are communicatively connected to the radio network controller 100. The radio network controller 100 assigns the base stations 200 to 203 radio parameters required to execute radio communications to the base stations and manages the assignment.

In particular, the mobile communication system according to the embodiment controls an in-out reception level (Qrxlevmin) for determining whether or not the mobile station 300 is to camp on a cell (a cell 250) formed by a base station (e.g., a base station 200) installed by a mobile telecommunications carrier or a user receiving a communication service provided by the mobile telecommunications carrier.

The base station 200 and the base station 201 are small-sized base stations (Home eNodeB) managed by a user of the communication service provided by the mobile telecommunications carrier. The base station 200 and the base station 201 are both installed in the Local Area Network (LAN) managed by the user and are connected to the radio network controller 100 provided on the mobile telecommunications carrier network 10 via the access line carrier providing FTTH and ADSL.

A Security Gateway (SGW) 400 is installed in a boundary between the mobile telecommunications carrier network 10 and the access line carrier network 20. The SGW 400 is a gateway for protecting the mobile telecommunications carrier network 10 against an unauthorized access from other communication networks. The SGW 400 permits only an access to the proper mobile telecommunications carrier network 10 authenticated by a predetermined authentication procedure.

It is assumed in the embodiment that different users respectively have the base station 200 and the base station 201. For this reason, a mobile station of the user managing one of the base stations is not given of a connection permission to the other of the base stations. On the other hand, a base station 202 and a base station 203 are base stations for public communications and are installed on the mobile telecommunications carrier network 10. As long as a user has a mobile station of the mobile telecommunications carrier, the user can be connected to the base station 202 and the base station 203 without particular limitations.

(2) Functional Block Configuration of Radio network controller 100

Figure 2:
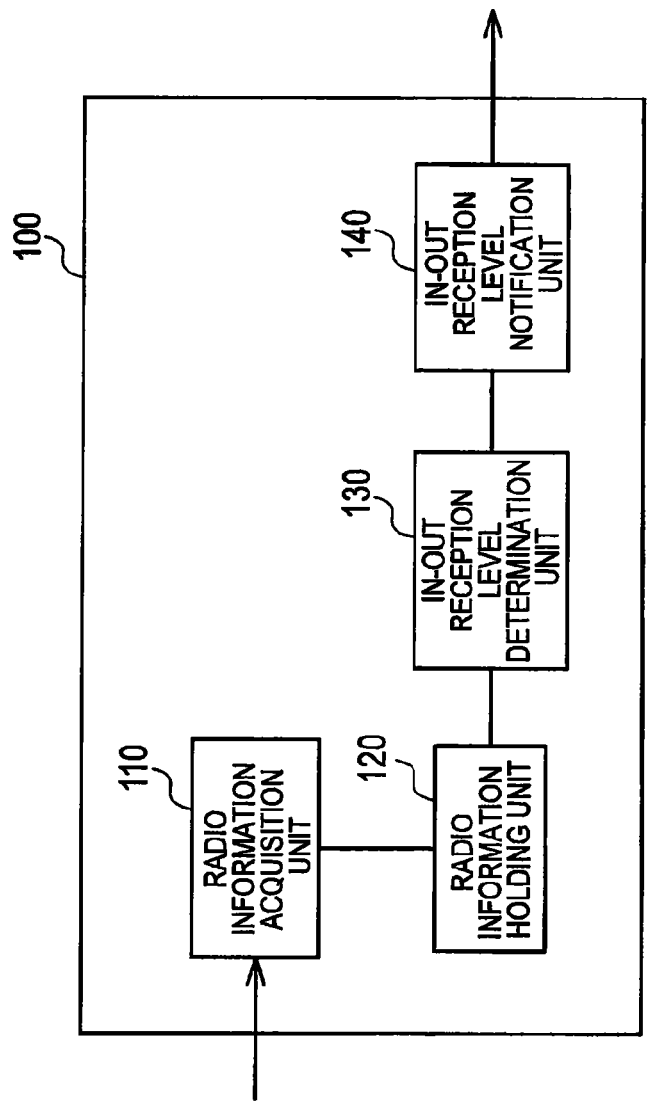
FIG. 2 is a functional block configuration diagram of a radio control unit 100 according to the embodiment of the invention.

FIG. 2 is a functional block configuration diagram of the radio network controller 100. As shown in FIG. 2, the radio network controller 100 includes a radio information acquisition unit 110, a radio information holding unit 120, an in-out reception level determination unit 130, and an in-out reception level notification unit 140.

The radio information acquisition unit 110 acquires a radio communication state of a neighboring cell (e.g., a cell 251) located around a cell (a cell 250) formed by a base station (e.g., a base station 200) which the mobile station 300 camps on among the base stations 200 to 203. Specifically, the radio information acquisition unit 110 acquires a reception level of the base station receiving the radio channel transmitted by a neighboring cell. Specifically, the radio information acquisition unit 110 acquires a reception level of the base station receiving a common control channel used commonly by multiple mobile stations 300.

Also, the radio information acquisition unit 110 acquires a transmission level of the common control channel transmitted by the neighboring cell. Note that a shared pilot channel (CPICH) or the like, for example, can be used as a channel for control, which is receivable in the neighboring cell.

The mobile information holding unit 120 holds information (the reception level) indicating the radio communication state of the neighboring cell (the base station) acquired by the radio information acquisition unit 110. Specifically, the radio information holding unit 120 holds the information in a format like the database 500 shown in FIG. 6.

The in-out reception level determination unit 130 determines an in-out reception level (Qrxlevmin) based on an acquisition result of the radio communication state acquired by the radio information acquisition unit 110.

Specifically, the in-out reception level determination unit 130 calculates a distance $D_A$ (an estimated distance) between a specific base station (e.g., the base station 200) and a target neighboring base station (e.g., the base station 202, hereinafter referred to as a target base station) based on the reception level and transmission level of the common control channel of the neighboring cell acquired by the radio base information acquisition unit 110. Also, the in-out reception level determination unit 130 calculates a distance $D_B$ between a reception level tie point P in which the reception level of the common control channel transmitted by the specific base station (the base station 200) and the reception level of the common control channel transmitted by the target base station (the base station 202) are substantially equal to each other and the base station 200.

The in-out reception level determination unit 130 calculates an estimated reception level of the common control channel in the reception level tie pint P and determines the in-out reception level based on the calculated estimated reception level. Note that the details of the operation of the in-out reception level determination unit 130 are described later.

The in-out reception level notification unit 140 transmits an in-out reception level determined by the in-out reception level determination unit 130 to the appropriate base station (e.g., the base station 200).

(3) Functional Block Configuration of Base Station 200

Figure 3:
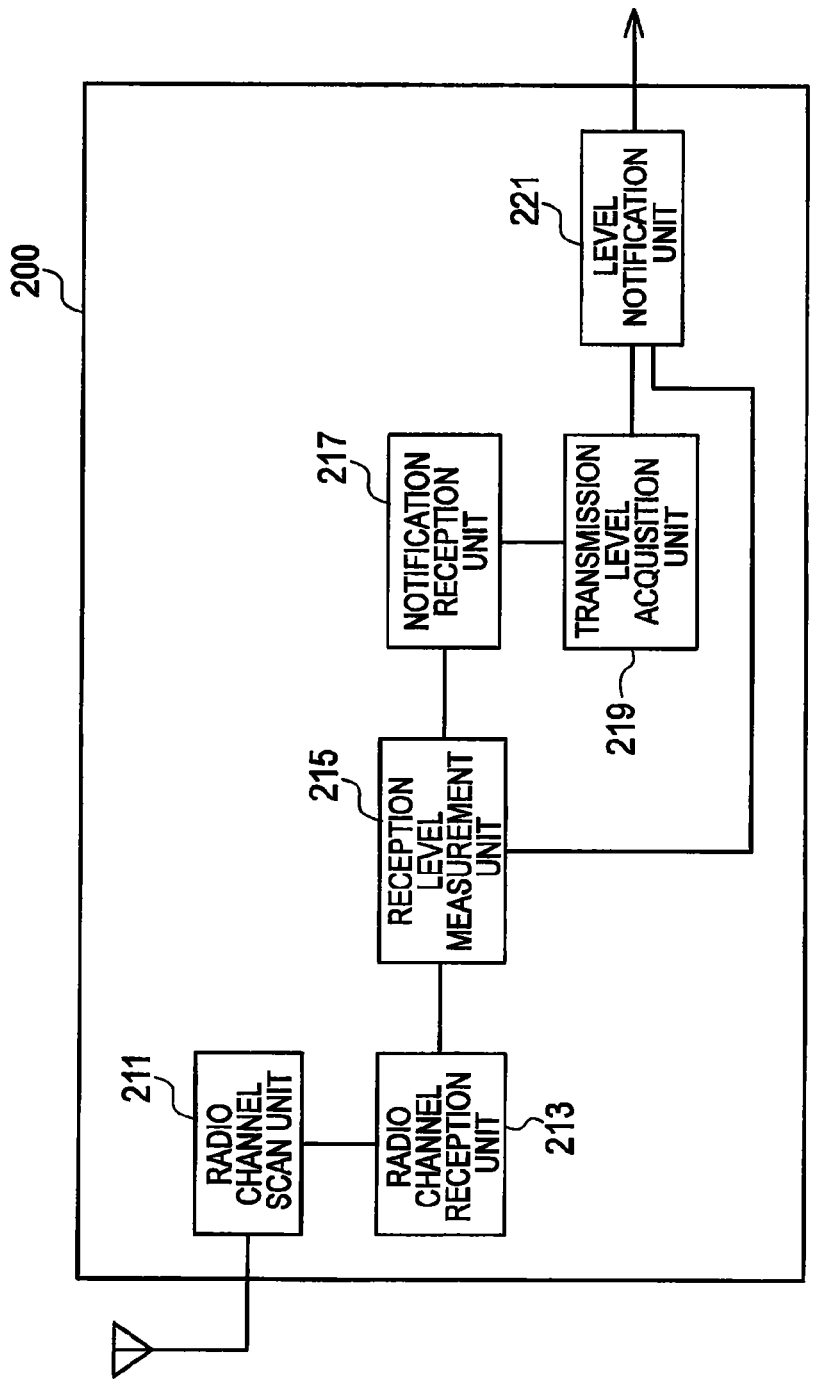
FIG. 3 is a functional block configuration diagram of a base station 200 according to the embodiment of the invention.

FIG. 3 is a functional block configuration diagram of the base station 200. The base station 200 can control the in-out reception level determining whether or not the mobile station 300 is to camp on the cell formed by the base station 200. As shown in FIG. 3, the base station 200 includes a radio channel scan unit 211, a radio channel reception unit 213, a reception level measurement unit 215, a notification reception unit 217, a transmission level acquisition unit 219, and a level notification unit 221.

The radio channel scan unit 211 scans the common control channel (a radio channel) of a neighboring cell (e.g., cell 251) located around the cell 205 formed by the base station 200 which the mobile station 300 camps on among the base stations 200 to 203. Specifically, the radio channel scan unit 211 performs scanning in a predetermined frequency bandwidth to determine whether or not the common control channel is transmitted.

The radio channel reception unit 213 receives the radio channel of the neighboring cell based on a scan result of the common control channel by the radio channel scan unit 211. The reception level measurement unit 215 measures a reception level of the common control channel in a neighboring cell received by the radio channel reception unit 220.

The notification reception unit 217 receives notification broadcasted to the entire cells by the base stations 201 to 203 forming the neighboring cells. The transmission level acquisition unit 219 acquires a transmission level of the common control channel in the cell contained in the notification received by the notification reception unit 217.

The level notification unit 221 notifies the radio network controller 100 of a reception level of the common control channel measured by the reception level measurement unit 215 and a transmission level of the common control channel acquired by the transmission level acquisition unit 219.

(4) Operation of Mobile Communication System

Figure 4:
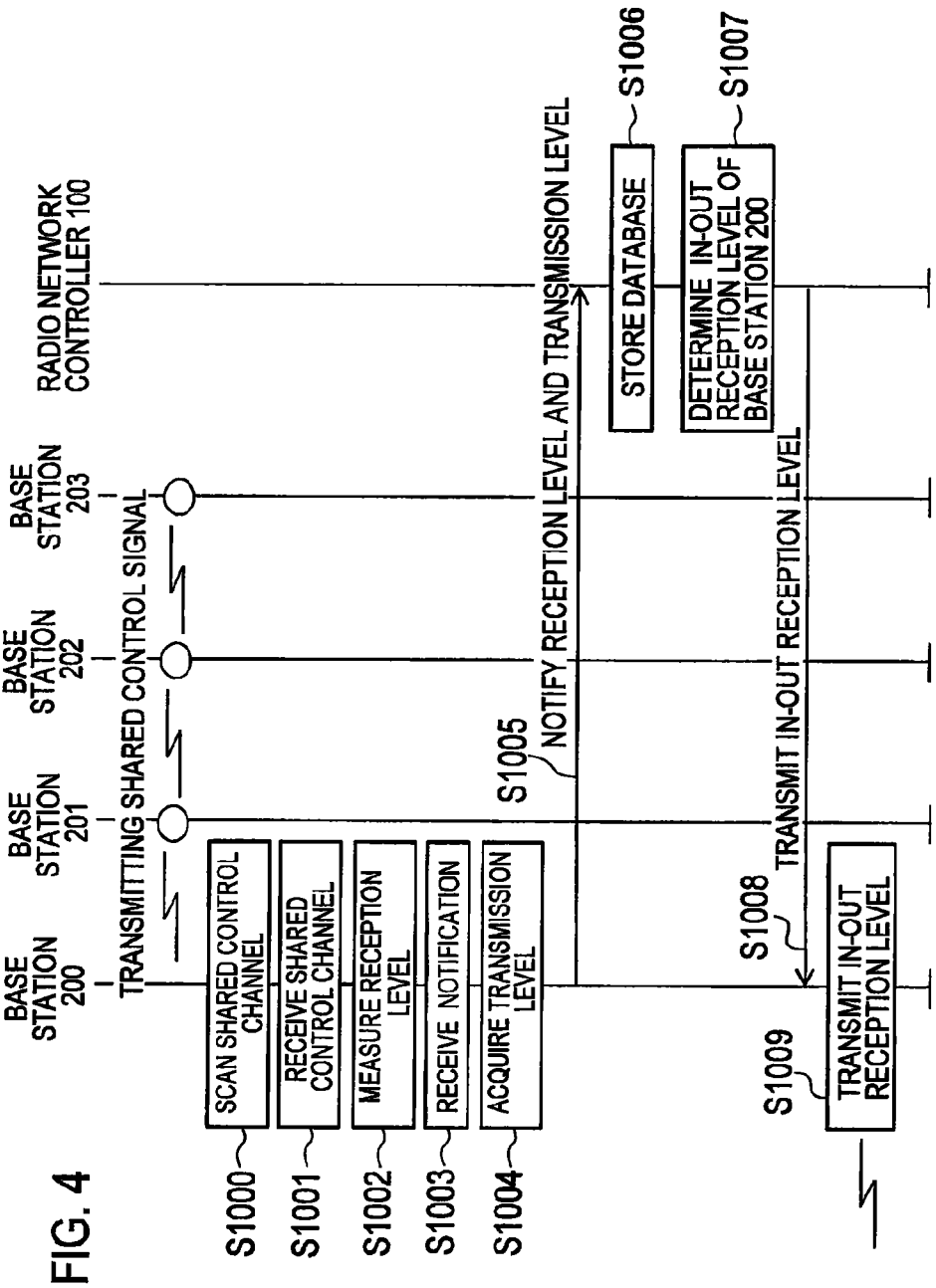
FIG. 4 is a drawing showing a sequence inside the mobile communication system in relation to the determination of an in-out reception level.

Hereinafter, described is an operation of the mobile communication system, specifically, an operation performed by the radio network controller 100 for determining an in-out reception level (Qrxlevmin). FIG. 4 is a drawing showing a sequence inside the mobile communication system in relation to the determination of in-out reception level.

Here, the operation of determining the in-out reception level of the base station 200 is described in a case where a base station 200 is newly installed in a location adjacent to service areas of the base stations 201 to 203 which are already in operation. Note that FIG. 4 shows a sequence in the case where a base station is newly installed, but may similarly show a case where the base station in operation automatically updates an in-out reception level.

As shown in FIG. 4, a newly-installed base station 200 (Home eNodeB) executes the scanning of the common control channel transmitted by the neighboring cells (the base stations 201 to 203) and tries to receive the common control channel (Step S1000). Here, the base station 200 receives the common control channel transmitted by the base stations 201 to 203 (step S1001).

The base station 200 measures a reception level of the common control channel transmitted by the base stations 201 to 203 (step S1002). Also, the base station 200 receives the notification transmitted to the entire cells by the base stations 201 to 203 (step S1003).

The base station 200 acquires a transmission level of the common control channel contained in the received notification. Specifically, the transmission level of the common control channel transmitted by the base stations 201 to 203 is acquired (step S1004). The base station 200 notifies the radio network controller 100 of a measured value of the reception level of the common control channel in the base station 200 transmitted by the base stations 201 to 203 and the reception level of the common control channel transmitted by the base stations 201 to 203.

Figures 5, 6:
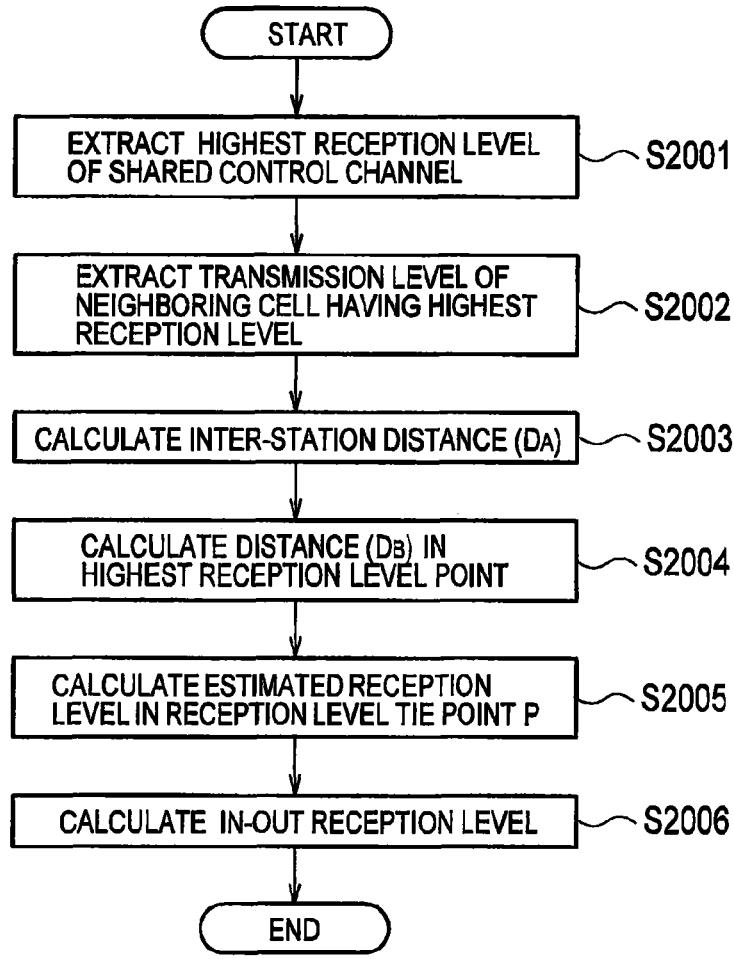
FIG. 5 is a drawing showing a flow in which the radio network controller 100 determines an outside/inside-cell reception level based on data of the reception levels stored in a database 500.
FIG. 6 is a drawing showing one example of the database 500 storing a reception level and a transmission level.

The radio network controller 100 stores the reception level and the transmission level which are notified from the base station 200 in the database 500 (step S1006). FIG. 6 shows an example of the database 500 storing the reception level and the transmission level. As shown in FIG. 6, the database 500 includes an identifier for a neighboring base station of the base station 200, a sector, the reception level of the common control channel, and the transmission level of the common control channel. Note that in the embodiment, the sector is regulated by the combination of the frequency and the service area (radiation direction of radio waves) and the reception level of the common control channel is acquired for each sector. Also, the cell includes multiple sectors using the same frequency, which have different covering service areas. Note that in the embodiment, as a matter of convenient explanation, the description is given as if each sector uses the same frequency.

The radio network controller 100 refers to the database 500 and determines an in-out reception level used in the base station 200 (step S1007). Note that a method of determining the in-out reception level is described later.

The radio network controller 100 notifies the base station 200 of the determined in-out reception level (step S1008). The base station 200 broadcasts the notified in-out reception level to the mobile station 300 (step S1009).

FIG. 5 shows a flow of determining by the radio network controller 100, specifically, the in-out reception level determination unit 130, an in-out reception level based on the reception level data stored in the database 500

The radio network controller 100 extracts a base station having the highest reception level among the reception levels in the base stations 201 to 203 of the common control channel stored in the database 500 (step S2001). Specifically, the radio network controller 100 extracts "−90 dBm" of the base station 202 (sector 1). Furthermore, the radio network controller 100 extracts the transmission level (40 dBm) of the common control channel of the base station (the base station 202) stored in the database 500 (step S2002).

The radio network controller 100 calculates a distance $D_A$ (see FIG. 7) between the base station 200 and the base station 202 based on the highest reception level (−90 dBm) among the reception levels in the base station 200 of the common control channels transmitted by the neighboring cells (the base stations), and the transmission level (40 dBm) of the common control channel in the target base station (the base station 202) transmitting the common control channel of the highest reception level.

Specifically, the radio network controller 100 calculates a distance $D_A$ by using values of the acquired reception level and transmission level and a propagation loss equation (step S2003). The propagation loss equation includes a free-space loss equation or an in-house propagation loss equation, and an equation may be properly selected according to the installation state of the base station 200. Note that each propagation loss equation is as follows.

Free-space loss equation:

$$L[\text{dB}]=32.44+20\times\log(f[\text{MHz}])+20\times\log(d[\text{km}]) \quad [\text{Math 1}]$$

In-house propagation loss equation:

$$L[\text{dB}]=20\times\log(f[\text{MHz}])+N\times\log(d[\text{m}])+L(n)-28 \quad [\text{Math 2}]$$

The parameter N is such that house: 28, office: 30, and commercial facility: 22 in the frequencies of 1.8 to 2.0 GHz. The parameter L(n) is such that house: 4n, office: 15+4*(n−1), commercial facility: 6+3*(n−1) in the frequencies of 1.8 to 2.0 GHz. Note that n is the number of walls through which electric waves pass between the base station and the mobile station.

The radio network controller 10 calculates an estimated reception level of the common control channel in a reception level tie point P in which the reception level of the common control channel transmitted by the base station 200 and the reception level of the common control channel transmitted by the base station 202 (the target base station) become substantially equal to each other. Furthermore, the radio network controller 100 determines the in-out reception level based on the calculated estimated reception level.

Figure 7:
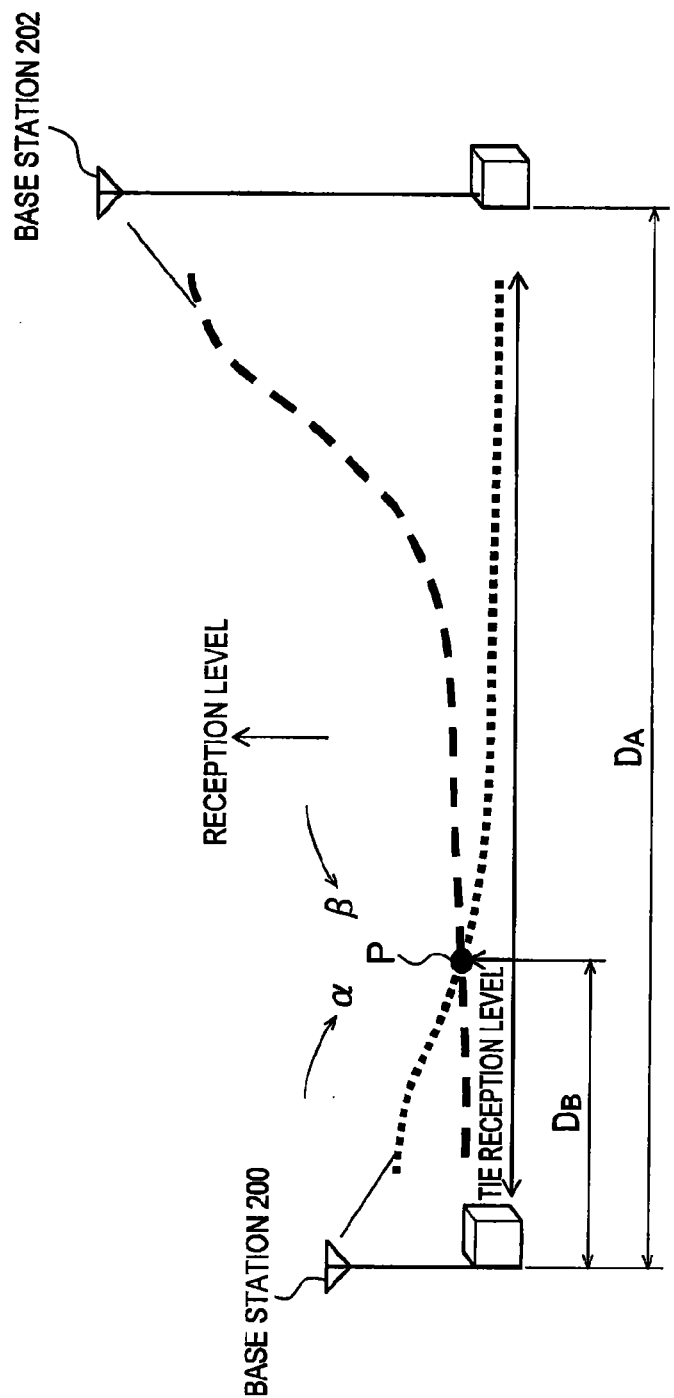
FIG. 7 is a drawing showing a relationship between reception levels of common control channels (radio channels) which are transmitted by the base station 200 and the base station 202 and a distance.

FIG. 7 is a drawing showing a relationship between reception levels of common control channels transmitted by the base station 200 and the base station 202 and the distance. In the base station 200, as moving from the base station itself (base station 200) to the base station 202, the reception level of the common control channel of the base station itself decreases while the reception level of the common control channel of the base station 202 increases.

The radio network controller 100 calculates an estimated reception level of the common control channel in the reception level tie point P in which the reception level of the base station 200 (the base station itself, i.e., the base station for which the in-out reception level is determined) and the reception level of the common control channel of the base station 202 tie with each other. The radio network controller 100 perform control such that the value obtained by adding a first offset value to the calculated estimated reception level is used as an in-out reception level of the base station 200.

Specifically, the radio network controller 100 calculates a distance $D_B$ between the reception level tie point P in which the reception levels of the common control channels of the base station 200 and the base station 202 tie with each other and the base station 200 by substituting the propagation loss obtainable from a difference between the reception level and the transmission level for the above-described propagation loss equation (step S2004).

Furthermore, the radio network controller 100 calculates an estimated reception level α (a first estimated reception level) that is a reception level in the reception level tie point P located apart from the base station 200 by the distance $D_B$ based on the transmission level of the common control channel transmitted by the base station 200 and the above-described propagation loss equation. Similarly, the radio network controller 100 calculates an estimated reception level β (a second estimated reception level) that is a reception level in the reception level tie point P located apart from the base station 202 by (the distance $D_A$—the distance $D_B$) based on the transmission level of the common control channel transmitted by the base station 202 and the above-described propagation loss equation (step S2005).

The radio network controller 100 calculates the reception level tie point P so that the estimated reception level α and the estimated reception level β become equal to each other and determines the calculated estimated reception level α as an in-out reception level (step S2006).

Here, in the embodiment, the radio network controller 100 calculates the in-out reception level (Qrxlevmin) by adding the first offset value (e.g., 3 dB) to the calculated estimated reception level α.

(5) Advantageous Effects

The radio network controller 100 according to the embodiment calculates a distance $D_A$ between the base station 200 and the base station 202 based on the highest reception level among the reception levels of the common control channels transmitted by neighboring cells (base stations) and the transmission level of the common control channel in the base station 202 transmitting the common control channel having the highest reception level.

Furthermore, based on the calculated distance $D_A$, the in-out reception level (Qrxlevmin) is determined based on the estimated reception level of the common control channel in the reception level tie point P in which the reception level of the common control channel transmitted by the base station 200 and the reception level of the common control channel transmitted by the base station 202 become substantially same with each other.

For this reason, the mobile station 300 of the user can be more surely camped on the cell 250 formed by the base station 200 being the small-sized base station installed by the user. In other words, the radio network controller 100 reduces a possibility that the mobile station 300 may camp on another cell and the user of the mobile station 300 can securely enjoy the advantage of the increase in throughput by the base station 200.

In the embodiment, the reception level tie point P is calculated so that the estimated reception level α from the base station 200 and the estimated reception level β from the base station 202 become equal to each other. For this reason, the estimated reception level in the reception level tie point P can be further correctly calculated. As a result, the mobile station 300 can be further surely camped on the cell 250 formed by the base station 200.

In the embodiment, the first offset value is added to the calculated estimated reception level α. For this reason, the mobile station 300 can be further surely camped on the cell 250 formed by the base station 200.

(6) Modification

The radio network controller 100 (the in-out reception level determination unit 130) may calculate an estimated reception level α in the reception level tie point P based on a corrected reception level in which a second offset value is added to the reception level of the common control channel transmitted by the base station 200. According to such a modification, the mobile station 300 can be further surely camped on the cell 250 formed by the base station 200.

(7) Other Embodiments

As described above, the contents of the present invention have been disclosed through the above-described embodiments. However, it should not be understood that the description and the drawings, which constitute one part of this disclosure, are to limit the present invention. Various alternative embodiments will be obvious for those who are in the art from this disclosure.

For example, the above-described embodiments of the invention describe the case where a mobile communication system complies with the W-CDMA scheme. However, the base stations 200 to 203 may include functions of the radio network controller 100 in the case of the LTE (Long Term Evolution) that is the next generation system of the W-CDMA. Specifically, the base stations 200 to 203 may include functions of the radio information acquisition unit 110, radio information holding unit 120, in-out reception level determination unit 130, and in-out reception level notification unit 140 of the radio network controller 100. Note that the base stations 200 to 203 may alternately share a radio communication state acquired by each of the base stations.

Furthermore, part of the functions of the functional blocks of the radio network controller 100 may be executed in the base station.

Also, in the above-described embodiment, the first offset value and the second offset value are used, but such offset values are not necessarily used.

It is natural that the present invention includes various embodiments which are not described herein. Accordingly, the technical scope of the present invention is defined only by particular matters of the invention according to the scope of claims which is appropriate from the above description.

Note that the contents of Japanese Patent Application Publication No. 2010-130535 (filed on Jun. 7, 2010) are hereby incorporated by reference in their entirety.

INDUSTRIAL APPLICABILITY

The invention can provide a mobile communication system, a base station, and a mobile communication method with which a mobile station can securely enjoy advantage of an increase in throughput by a small-sized base station, and therefore is useful in radio communications and the like.

EXPLANATION OF THE REFERENCE NUMERALS

10 . . . mobile telecommunications carrier network
20 . . . access line carrier network
100 . . . radio network controller
110 . . . radio information acquisition unit
120 . . . radio information holding unit
130 . . . in-out reception level determination unit
140 . . . inside/outside-cell threshold notification unit
200 to 203 . . . base station
211 . . . radio channel scan unit
213 . . . radio channel reception unit
215 . . . reception level measurement unit
217 . . . notification reception unit
219 . . . transmission level acquisition unit
221 . . . level notification unit
250, 251 . . . cell
300 . . . mobile station
400 . . . SGW
500 . . . database

The invention claimed is:

1. A mobile communication system which controls an in-out reception level for determining whether or not a mobile station is to camp on a cell formed by a base station, comprising:
circuitry comprising
an acquisition unit configured to acquire a radio communication state of a neighboring cell located around a cell formed by a base station which the mobile station camps on among base stations; and
a level determination unit configured to determine the in-out reception level based on an acquisition result of the radio communication state by the acquisition unit, wherein
the acquisition unit acquires a reception level of the base station receiving a radio channel transmitted by the neighboring cell, and a transmission level of the radio channel transmitted by the neighboring cell, wherein
based on a highest reception level among the reception levels of the base station receiving radio channels transmitted by neighboring cells and a transmission level of the radio channel in a target base station transmitting a radio channel having the highest reception level, the level determination unit calculates an estimated distance between the base station and the target base station,
based on the calculated estimated distance, the level determination unit calculates an estimated reception level of the radio channel in a reception level tie point in which the reception level of the radio channel transmitted by the base station and the reception level of the radio channel transmitted by the target base station become substantially equal to each other, and determines the in-out reception level based on the calculated estimated reception level, and
wherein the level determination unit calculates a first estimated reception level based on a propagation loss equation and the transmission level of the radio channel transmitted by the base station, calculates a second estimated reception level based on the propagation loss equation and the transmission level of the radio channel transmitted by the target base station, calculates the reception level tie point so that the first estimated reception level and the second estimated reception level become equal to each other, and determines the calculated first estimated reception level as the in-out reception level.

2. The mobile communication system according to claim 1, wherein the level determination unit calculates the in-out reception level by adding a first offset value to the calculated first estimated reception level.

3. The mobile communication system according to claim 1, wherein the level determination unit calculates the estimated reception level in the reception level tie point based on a corrected reception level obtained by adding a second offset value to the reception level of the radio channel transmitted by the base station.

4. A radio network controller configured to control an in-out reception level for determining whether or not a mobile station is to camp on a cell formed by a base station, comprising:
circuitry comprising
an acquisition unit configured to acquire a radio communication state of a neighboring cell located around a cell formed by a base station which the mobile station camps on among base stations; and
a level determination unit configured to determine the in-out reception level based on an acquisition result of the radio communication state by the acquisition unit, wherein
the acquisition unit acquires a reception level in the base station receiving a radio channel transmitted by the neighboring cell, and a transmission level of the radio channel transmitted by the neighboring cell, wherein
based on a highest reception level among the reception levels of the base station receiving radio channels transmitted by neighboring cells and a transmission level of the radio channel in a target base station transmitting a radio channel having the highest reception level, the level determination unit calculates an estimated distance between the base station and the target base station, based on the calculated estimated distance, the level determination unit calculates an estimated reception level of the radio channel in a reception level tie point in which the reception level of the radio channel transmitted by the base station and the reception of the radio channel transmitted by the target base station become substantially equal to each other, and determines the in-out reception level based on the calculated estimated reception level, and wherein the level determination unit calculates a first estimated reception level based on a propagation loss equation and the transmission level of the radio channel transmitted by the base station, calculates a second estimated reception level based on the propagation loss equation and the transmission level of the radio channel transmitted by the target base station, calculates the reception level tie point so that the first estimated reception level and the second estimated reception level become equal to each other, and determines the calculated first estimated reception level as the in-out reception level.

5. A radio communication method for controlling an in-out reception level for determining whether or not a mobile station is to camp on a cell formed by a base station, comprising the steps of:

acquiring a radio communication state of a neighboring cell located around a cell formed by a base station which the mobile station camps on among base stations; and determining the in-out reception level based on an acquisition result of the acquired radio communication state, wherein the acquisition step includes acquiring a reception level of the base station receiving a radio channel transmitted by the neighboring cell and acquiring a transmission level of the radio channel transmitted by the neighboring cell, the determination step includes:
based on a highest reception level among the reception levels of the base station receiving radio channels transmitted by the neighboring cells and a transmission level of the radio channel in a target base station transmitting a radio channel having the highest reception level, calculating an estimated distance between the base station and the target base station, based on the calculated estimated distance, calculating an estimated reception level of the radio channel in a reception level tie point in which the reception level of the radio channel transmitted by the base station and the reception of the radio channel transmitted by the target base station become substantially equal to each other, and determining the in-out reception level based on the calculated estimated reception level, and wherein determining the in-out reception level further includes calculating a first estimated reception level based on a propagation loss equation and the transmission level of the radio channel transmitted by the base station, calculating a second estimated reception level based on the propagation loss equation and the transmission level of the radio channel transmitted by the target base station, calculating the reception level tie point so that the first estimated reception level and the second estimated reception level become equal to each other, and determining the calculated first estimated reception level as the in-out reception level.

6. A base station configured to control an in-out reception level for determining whether or not a mobile station is to camp on a cell formed by a base station, comprising:

circuitry comprising a radio channel scan unit configured to scan a radio channel of a neighboring cell located around a cell formed by the base station which the mobile station camps on among base stations; and a radio channel reception unit configured to receive a radio channel of the neighboring cell;

a reception level measurement unit configured to measure a reception level of the radio channel of the neighboring cell;

a notification reception unit configured to receive notification of the neighboring cell;

a transmission level acquisition unit configured to acquire a transmission level of the radio channel of the neighboring cell;

a level notification unit configured to notify a radio network controller of the reception level measured by the reception level measurement unit and the transmission level acquired by the transmission level acquisition unit; and wherein the circuitry calculates a first estimated reception level based on a propagation loss equation and the transmission level of the radio channel transmitted by the base station, calculates a second estimated reception level based on the propagation loss equation and the transmission level of a radio channel transmitted by a target base station, calculates a reception level tie point so that the first estimated reception level and the second estimated reception level become equal to each other, and determines the calculated first estimated reception level as the in-out reception level.

* * * * *